Patented Apr. 24, 1951

2,550,450

UNITED STATES PATENT OFFICE 2,550,450

DEFOAMER

Leo C. Brown and John E. Farbak, Chicago, Ill., assignors to Swift & Company, Chicago, Ill., a corporation of Illinois No Drawing. Application June 6, 1947, Serial No. 753,060

7 Claims. (Cl. 195—107)

This invention relates in general to a process and means for producing antibiotics, and more particularly to a process and means for producing antibiotics, such as penicillin, streptomycin, and the like, by the deep culture fermentation method.

It is well known that certain of the aerobic antibiotics may be produced commercially by growing the organism in large tanks varying in capacity from 2500 to 10,000 gallons, in which has been placed a solution of lactose and corn steep solids. Before the above mixture is inoculated with the culture it is first sterilized by injecting live steam into the tank until sterilization is complete. A large quantity of sterile air may be passed therethrough while the mixture is cooling. When the temperature has reached about 20° C. the mixture is inoculated with a carefully prepared culture of the organism. The aeration is continued for about three days until the mold grows prolifically and produces the desired compounds. Then the mold is removed by filtration and the compound extracted from the water solution.

During the fermentation period, while air is blown through the mixture, and during the cooling period, if air is employed, excessive foaming occurs. Most of the manufacturers have automatic equipment for detecting the presence of excessive foam in the tanks. Some have automatic devices for adding an anti-foam agent. Others depend upon the manual addition of an anti-foaming agent when the automatic device detects the presence of excessive foam. Despite these precautions, however, the actual production of antibiotics such as penicillin has been materially reduced because the fermentation tanks in which the molds grow cannot be utilized to their full capacity. This has been largely due to the absence of an efficient, non-toxic defoaming agent which is applicable to the process of producing penicillin, streptomycin, and other antibiotics produced by the deep culture method.

Heretofore certain sulfur derivatives of oil have been employed as defoaming agents, but these sulfur compounds are very corrosive and necessitate periodically replacing supply lines and reaction vessels. Another widely used defoamer for the instant type of process is a solution of octodecanol. The alcohol, however, has a tendency to separate out of solution at plant operating temperatures and clog feed lines. Thus, difficulty is often experienced in transferring the anti-foaming agent from drums or other containers to the plant equipment and to the fermentation tanks, often when the need is most critical; thereby causing unnecessary losses and reducing overall production. Moreover, octodecanol produces excessive yields of undesirable type penicillin.

Among the objects of this invention are to overcome the foregoing and other objections, and to improve the process of preparing antibiotics by the deep culture method so as to obtain substantially increased yields.

Another object of the invention is to provide a more efficient defoaming agent applicable to the production of antibiotics by the deep culture method whereby fermentation tanks can be used to their maximum capacity.

A further object of the invention is to provide in the deep culture method of producing antibiotics a defoaming agent which is non-corrosive to plant equipment and apparatus.

An additional object of the invention is to provide in the deep culture method of producing antibiotics a defoamer which is non-toxic to the antibiotic mold.

Another object of the invention is to provide in the deep culture method of producing antibiotics a defoaming agent which is non-volatile and which possesses a high degree of stability after prolonged periods.

Another object of the invention is to provide a defoaming agent which will increase the production of desired type penicillin.

Still further objects will be apparent from the description and claims to follow.

According to the present invention it has been discovered that the foregoing and other objects can be achieved by employing in the deep culture fermentation method of preparing antibiotics a defoaming agent comprising a suitable mixture of partial glycerides of a glyceride oil and a suitable glyceride oil or a mixture of a glyceride oil and mineral oil comprising a carrier therefor.

The present invention and manner of using the new defoamer as hereinafter described shows the invention applied to the process of producing penicillin, although the invention should not be limited thereto: A solution of 2% lactose and 2% corn steep solids is placed in large tanks varying in capacity from 2500 to 10,000 gallons and a small amount of organic or inorganic salts may be added. The mixture is then sterilized by injecting live steam into the tanks until sterilization is complete. A large quantity of sterile air is then passed through the mixture as it cools. When the temperature has reached 20° C. the mixture is inoculated with the carefully prepared culture of the penicillin organism. The aeration is continued for almost three days until the mold grows prolifically and produces penicillin compounds. During the fermentation and cooling periods while air is blown through the mixture excessive foaming invariably occurs unless means are taken to abate the foam. Thus, when the foam begins to rise slightly, a sterilized defoaming agent which has been held at a temperature of about 140° F. for two or three days and thoroughly agitated is added as required to reduce the foam either manually or by automatic equipment. For a 3,000 gallon fermentation tank approximately 8 to 10 gallons of the defoaming agent is required. After approximately 3 days the mold is removed by filtration and the penicillin extracted from the water solution.

The following examples will specifically illustrate several defoamers which may be employed but should not be limited thereto:

*Example I*

5 per cent of a mixture of partial glycerides of Prime Burning lard oil
95 per cent Prime Burning lard oil The partial glycerides of Prime Burning lard oil may be prepared by heating a given quantity of Prime Burning lard oil to a temperature of 400° F. in the presence of an excess of glycerol under a pressure of 3 pounds of hydrogen with 0.1 per cent sodium hydroxide as a catalyst. The partial glyceride mixture is then washed with phosphoric acid to remove the soap, and finally filtered.

*Example II*

4 per cent of a mixture of partial glycerides of hydrogenated cottonseed oil
96 per cent refined cocoanut oil The cottonseed oil is first hydrogenated so as to have a melting point of approximately 92° F., and then reacted to form the partial glycerides in a manner similar to that described in Example I.

*Example III*

4 per cent of a mixture of partial glycerides of cottonseed oil
96 per cent Extra Winter Strain lard oil

*Example IV*

3 per cent of a mixture of partial glycerides of Extra Winter Strain lard oil
97 per cent Prime Burning lard oil

*Example V*

10 percent of a mixture of partial glycerides of Prime Burning lard oil
40 per cent Prime Burning oil
50 per cent mineral oil (100 viscosity)

*Example VI*

10 per cent of a mixture of partial glycerides of Prime Burning lard oil
45 per cent Extra Winter Strain grease oil
45 per cent mineral oil (100 viscosity)

*Example VII*

5 per cent of a mixture of partial glycerides of Extra Winter Strain oil
60 per cent Prime Burning lard oil
40 per cent mineral oil (200 viscosity)

The partial glycerides in Example II through VII are formed in a manner similar to that described in Example I.

It should be understood that the partial glyceride reaction products of other glyceride oils may be prepared according to the above or any well-known method of preparing mono or diglycerides. Since the yields of partial and particularly monoglyceride from the above described reaction are substantial, it is unnecessary to isolate the partial and monoglyceride in particular, although if this were done smaller percentages would be required in the oil carrier to produce the desired results.

In general it can be said any glyceride oil can be used to form the partial glyceride reaction mixture provided the partial glycerides formed are non-toxic to the mold and will substantially remain in solution or suspension in the oil carrier at plant operating temperatures, generally around 70-80° F. Thus, in addition to Prime Burning lard oil, partially hydrogenated cottonseed oil, and Extra Winter Stain oil, other animal and vegetable glyceride oils may be used to form the glyceride products. For example, any of the following vegetable oils may be employed: cocoanut oil, corn, kapoc, linseed, mustard seed, olive, peanut, perilla, rapeseed, sesame, sunflower, teaseed. The following are examples of animal glyceride oils which may be employed: Prime edible lard oil, Prime inedible lard oil, pure neat's foot oil, refined white grease, 20% neat's-foot oil, Extra No. 1 lard oil, Special No. 1 lard oil, Prime Steam lard, No. 1 lard oil, No. 2 lard oil, and pigskin grease oil. Each of the foregoing animal oils is available on the market as a standard article of commerce and is of normal commercial purity. Any of the above oils which have been partially hydrogenated may also be employed to form the partial glycerides. It should, of course, be understood that the partially hydrogenated oils do not necessarily have a melting point below plant operating temperatures.

The glyceride products resulting from the reaction between glycerol and fatty acid groups containing hydroxyl radicals, particularly ricinoleic acid, are toxic to the mold which produces penicillin and streptomycin and therefore are undesirable, although effective defoamers in other respects.

In order to achieve the desired results most economically, the partial glyceride product is mixed with an oil which acts as a carrier or diluent and which preferably also has defoaming properties. In general, it can be said that any glyceride oil or a mixture of a glyceride and mineral oil can be used as the carrier for the partial glyceride which is fluid at plant operating temperatures and which will retain the partial glyceride in solution or suspension at said temperatures, providing the oil is not toxic to the molds. Thus, for example, the following animal glyceride oils may be employed: Prime Burning lard oil, Extra Winter Strain lard oil, refined white grease, Prime edible lard oil, Prime inedible lard oil, pure neat's-foot oil, Prime Steam lard, 20% neat's-foot oil, Prime neat's-foot oil, Extra neat's-foot oil, No. 1 neat's-foot oil, No. 2 lard oil, and pigskin grease oil. The following are examples of vegetable glyceride oils which may be employed: cottonseed oil, cocoanut oil, corn, kapoc, linseed, mustard seed, olive, peanut, perilla, rapeseed, sesame, sunflower, teaseed. It is also possible to employ a refined mineral oil having a 100-200 seconds Saybolt viscosity, a 350-450° F. flash point, and a low carbon residue, although the mineral oil may have a viscosity as high as 500 seconds Saybolt.

It has been observed that soybean oil and cottonseed oil show some toxicity to the penicillin mold. In fact, all vegetable oils within the specified group of glyceride oils exhibit some objectionable degree of toxicity to penicillin molds and do not produce optimum results.

Some glyceride oils, although not toxic to the penicillin mold in the usual sense, are nevertheless unsatisfactory as carriers for the partial glycerides because they appear to nourish an undesired fraction of the penicillin compound in preference to the desired fraction. It appears as though a carrier having a minimum amount of high unsaturation is desirable. For this reason an oil having a melting point below 60° F. does not produce optimum results when used as a carrier for the partial glyceride.

It is also possible to use mineral oils as a carrier for the partial glycerides since mineral oils have no toxic effect on the antibiotic mold. These mineral oils, however, have no defoaming properties in themselves and must be blended with glyceride oils to give satisfactory foam control. Although the use of glyceride-mineral oil carriers reduces the overall yield of penicillin, they also reduce considerably the production of undesirable type penicillin. Consequently, a glyceride oil-mineral oil mixture in roughly equal proportions has been found to be highly satisfactory as a carrier for the partial glyceride. The glyceride-mineral oil carrier also effectively controls foam in streptomycin production without deleterious effect on the fermentation.

Although components of the defoaming agent may be combined in varying proportions to suit the particular problem, it is generally sufficient and desirable to combine about 2.5 to 5 per cent of a partial glyceride mixture with a glyceride oil carrier or 2.5 to 10 per cent partial glyceride with a glyceride-mineral oil carrier. Most effective results occur generally with a mixture containing approximately 5 per cent of the partial glyceride in the glyceride oil carrier and 10 per cent partial glyceride in a glyceride-mineral oil carrier. When more than 10 per cent of the glyceride reaction product is used, good results are obtained but generally there is no marked improvement. The economics of the particular situation may determine the amounts and proportions of the respective ingredients employed and in some instance the concentrations of the partial glyceride in the carrier will depend upon the particular mold being grown and the process being employed.

The partial glyceride and oil carrier, when combined to form the new defoaming agent, reduced the interfacial surface tension in the fermentation tank. A study of the effectiveness of partial glyceride-oil mixtures in lowering the interfacial tension at oil-water interfaces indicates that a concentration of 10 per cent should lower the interfacial tension approximately to zero.

When ready to employ the heretofore described defoaming agent in a deep culture process of manufacturing antibiotics, such for example as penicillin, the defoaming agent should be held at a temperature of about 140° F. for a period of two to three days and then agitating the drum to be certain there has been no crystallization of the active ingredients. The crystallization encountered should not be great except under drastic storage conditions, but in every case some method of being certain that a homogeneous product is delivered to the fermenter should be employed. The defoamer may then be sterilized. It is advisable to sterilize the defoaming agent separately from the media before adding it to the media. For the production of penicillin it seems advisable to add the defoaming agent only after the foam has begun to rise slightly and then add the defoamer as required to reduce the foam, either manually or by means of automatic equipment. For a 3,000 gallon fermenter approximately 8 to 10 gallons of the defoaming agent is generally required.

In the production of streptomycin, better results are obtained by adding practically all of the sterilized defoaming agent just before agitation and aeration are started, thereby enabling both the agitation and aeration to be kept at a low rate for the first 24 hours. This is highly desirable because it gives the mold a better chance to grow during the initial and critical stage of the process.

Because of the improved defoaming agent employed and the method of employing said agent, the fermentation tanks containing the mold can be used more nearly to their maximum capacity. There is no longer a necessity for maintaining a very large safety factor in filling the vessels. Thus, yields are substantially increased as compared with the prior art practices.

As previously mentioned, an important advantage possessed by the present invention is the ability of the defoamer to maintain its fluidity at normal plant operating temperatures. If temperatures are maintained in the plant at around 70° F. or above, the defoaming agent will remain a homogeneous liquid and can be circulated through the circulating system or handled in other ways similar to any fluid oil. Thus, the blocking of feed lines encountered with some widely used defoamers is not a hazard with the hereindescribed defoaming agents when normal and reasonable plant operating conditions are maintained.

In the specification and claims which follow the terms "Prime Burning lard oil" and "Extra Winter Strained lard oil" should be understood to mean the animal glyceride oils obtained by fractional crystallization and pressing of lard which have the following specifications:

| | Prime Burning Lard Oil | Extra Winter Strained Lard Oil |
|---|---|---|
| Free fatty acids as Oleic (max.) per cent | 0.50 | 2.00–4.00 |
| Titer °C | 32–34 | 32–34 |
| Iodine No | 73–76 | 73–76 |
| Saponification No | 193–198 | 193–198 |
| Smoke point (Open Cup) °F | 300–350 | 250–280 |
| Flash point (Open Cup) °F | 610–635 | 525–550 |
| Burning point (Open Cup) °F | 670–680 | 670–680 |
| Pour point (FAC) °F | 36–40 | 36–40 |
| Flow point (FAC) °F | 45–55 | 45–55 |
| Cloud point (FAC) °F | 35–40 | 34–40 |
| Specific Gravity at 25/25° C | 0.9128–0.9134 | 0.9120–0.9125 |
| Refractive Index (ZB at 40° C.) | 51–52 | 51–52 |
| Melting point (FAC) °F | 65–75 | 65–75 |
| Viscosity (Saybolt at 100° F.) sec | 209–218 | 200–210 |

Obviously many modifications and variations of the invention hereinbefore set forth may be made without departing from the spirit and scope thereof, and therefore only such limitations should be imposed as are indicated in the appended claims.

We claim:

1. In the process of producing antibiotics by the deep culture fermentation method, the step of abating and reducing foam therein which comprises adding to a fermentation tank containing the antibiotic culture, a defoamer mixture having as an essential active ingredient at least approximately 2.5 per cent of a partial glyceride of an animal glyceride oil, and a mixture of approximately equal proportions of an animal glyceride oil and a mineral oil as a carrier therefor.

2. An anti-foaming agent for use in the deep culture method of producing antibiotics, comprising as the essential active ingredient thereof, between approximately 2.5 and 10 per cent of a partial glyceride of an animal glyceride oil, and a mixture of approximately equal proportions of an animal glyceride oil and a mineral oil as a carrier therefor.

3. An anti-foaming agent for use in the deep culture method of producing antibiotics, comprising as the essential active ingredient thereof, approximately 10 per cent of a partial glyceride of Prime Burning lard oil and a mixture of approximately 40 per cent of an animal glyceride oil and approximately 50 per cent of a mineral oil as a carrier therefor.

4. An anti-foaming agent for use in the deep culture method of producing antibiotics, comprising as the essential active ingredient thereof, between about 2.5 and 10 per cent of a partial glyceride of Extra Winter Strain lard oil and a mixture of about equal parts of an animal glyceride oil and a mineral oil as a carrier therefor.

5. An anti-foaming agent for use in the deep culture method of producing antibiotics comprising as the essential active ingredient thereof between about 2.5 and 10 per cent of a partial glyceride of an animal glyceride oil dispersed in about equal parts of a carrier selected from the group consisting of animal glyceride oils and a mineral oil.

6. An anti-foaming agent for use in the deep culture method of producing antibiotics comprising as the essential active ingredient thereof a small amount of a partial glyceride of a glyceride oil having only one carbon atom of the fatty acid radicals thereof joined to an oxygen atom and a mixture of a glyceride oil and a mineral oil in approximately equal proportions as a carrier for said partial glyceride.

7. A process of producing antibiotics by the deep culture fermentation method, the step of abating and reducing foam therein, which comprises adding to a fermentation tank containing the antibiotic culture a defoamer mixture having as the essential active ingredient at least about 2.5 per cent of a partial glyceride of a glyceride oil having only one carbon atom of the fatty acid radicals thereof joined to an oxygen atom, and a mixture of approximately equal proportions of a glyceride oil and a mineral oil as the carrier therefor.

LEO C. BROWN.
JOHN E. FARBAK.

REFERENCES CITED

The following references are of record in the file of this patent:

UNITED STATES PATENTS

| Number | Name | Date |
|---|---|---|
| 1,916,614 | Harrison | July 4, 1933 |
| 2,277,716 | Lockwood et al. | Mar. 31, 1942 |
| 2,304,304 | Fritz | Dec. 8, 1942 |
| 2,390,212 | Fritz | Dec. 4, 1945 |
| 2,443,825 | Johnson | June 22, 1948 |
| 2,443,989 | Moyer | June 22, 1948 |

OTHER REFERENCES

Stefaniak, Jr., Bacteriology, vol. 52, No. 1, July 1946, pages 125–127.

Penicillin Research Progress Report, No. 8, July 8, 1944, Univ. of Wisconsin and O. P. R. D., W. P. B. Contract 118, pages 1 and 3.

Bennett, Food Mfg., 1940, pages 187–8.